(12) United States Patent
Payne et al.

(10) Patent No.: US 10,109,218 B2
(45) Date of Patent: Oct. 23, 2018

(54) SYSTEMS AND METHODS FOR DRIVER COACHING

(71) Applicant: Toyota Motor Engineering & Manufacturing North America, Inc., Erlanger, KY (US)

(72) Inventors: Joshua D. Payne, Irvine, CA (US); Craig Cauthen, Orange, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 199 days.

(21) Appl. No.: 14/835,324

(22) Filed: Aug. 25, 2015

(65) Prior Publication Data

US 2017/0061825 A1    Mar. 2, 2017

(51) Int. Cl.
G09B 19/16 (2006.01)
G07C 5/08 (2006.01)
G09B 5/02 (2006.01)
G07C 5/02 (2006.01)

(52) U.S. Cl.
CPC ............ *G09B 19/167* (2013.01); *G07C 5/02* (2013.01); *G07C 5/08* (2013.01); *G09B 5/02* (2013.01)

(58) Field of Classification Search
CPC . G07C 5/02; G07C 5/08; G07C 5/008; G07C 5/004; G09B 19/167; G09B 5/02; G01C 21/32
USPC ...................................... 434/66, 65; 701/123
See application file for complete search history.

(56) References Cited

U.S. PATENT DOCUMENTS

| 8,116,971 | B2 | 2/2012 | Chen et al. |
| 8,290,701 | B2 | 10/2012 | Mason et al. |
| 8,510,200 | B2 | 8/2013 | Pearlman et al. |
| 8,725,396 | B2 | 5/2014 | Guéziec et al. |
| 8,897,999 | B2 * | 11/2014 | Takeuchi ............... G01C 21/32 |
| | | | 701/123 |
| 8,996,290 | B2 * | 3/2015 | Robl ...................... G07C 5/008 |
| | | | 701/123 |
| 9,564,065 | B2 * | 2/2017 | Kwak .................. G09B 19/167 |
| 9,569,984 | B2 * | 2/2017 | Stankoulov .......... G09B 19/167 |
| 2007/0143002 | A1 * | 6/2007 | Crowell ................ G07C 5/004 |
| | | | 701/123 |

(Continued)

FOREIGN PATENT DOCUMENTS

EP    1973078    5/2011

*Primary Examiner* — Eddy Saint-Vil
(74) *Attorney, Agent, or Firm* — Dinsmore & Shohl LLP

(57) ABSTRACT

Systems and methods for driver coaching are described. One embodiment of a method includes determining first vehicle efficiency data from a first vehicle as the first vehicle is traversing a route, where the vehicle efficiency data relates to a driving efficiency of a driver of the first vehicle. The method may also be configured for determining second vehicle efficiency data associated with a second vehicle that previously traversed the route and determining a driver score from the first vehicle efficiency data. Some embodiments may also be configured for comparing the driver score with the second vehicle efficiency data to determine whether the driver can improve the driving efficiency and in response to determining that the driver can improve, providing instructions for traversing a remaining portion of the route, based on actions taken by the third party in traversing that portion of the route.

20 Claims, 5 Drawing Sheets

(56) References Cited

U.S. PATENT DOCUMENTS

| | | | |
|---|---|---|---|
| 2012/0143484 A1* | 6/2012 | Sawada | B60L 3/12 701/123 |
| 2012/0197517 A1* | 8/2012 | Sengoku | G07C 5/008 701/123 |
| 2013/0164712 A1* | 6/2013 | Hunt | G09B 19/167 434/65 |
| 2013/0164715 A1* | 6/2013 | Hunt | G09B 19/167 434/65 |
| 2014/0244150 A1 | 8/2014 | Boesch et al. | |

* cited by examiner

SYSTEMS AND METHODS FOR DRIVER COACHING

TECHNICAL FIELD

Embodiments described herein generally relate to systems and methods for driver coaching and, more specifically, to embodiments for instructing a driver on driving techniques for more efficient use of a vehicle.

BACKGROUND

Many drivers are proficient at traversing a distance in a vehicle. However, very few drivers know how to optimize the vehicle in terms of fuel efficiency, vehicle preservation, travel time, and other objectives. As an example, many users do not know how to operate a vehicle to minimize brake wear; to maximize fuel efficiency, and/or otherwise operate the vehicle in an efficient manner. As such, there exists a need in the industry.

SUMMARY

Systems and methods for driver coaching are described. One embodiment of a method includes determining first vehicle efficiency data from a first vehicle as the first vehicle is traversing a route, where the vehicle efficiency data relates to a driving efficiency of a driver of the first vehicle. The method may also be configured for determining second vehicle efficiency data associated with a second vehicle that previously traversed the route and determining a driver score from the first vehicle efficiency data. Some embodiments may also be configured for comparing the driver score with the second vehicle efficiency data to determine whether the driver can improve the driving efficiency and in response to determining that the driver can improve, providing instructions for traversing a remaining portion of the route, based on actions taken by the third party in traversing that portion of the route.

In another embodiment, a system for driver coaching includes a vehicle computing device that comprises a memory component and a processor, where the memory component stores logic that, when executed by the processor causes the system to determine first driving data from a first vehicle that traversed a route, determine second driving data associated with a second vehicle that traversed the route, and compare the driver score with the second vehicle efficiency data to determine a manner in which the driver can improve the driving efficiency. In some embodiments, the logic causes the system to provide instructions to the driver to improve the driving efficiency.

In yet another embodiment, a computing device includes a processor and a memory component that stores logic that, when executed by the processor, causes the computing device to determine first driving data from a first vehicle that traversed a route, determine second driving data associated with a second vehicle that traversed the route, and compare the first driving data with the second driving data to determine a manner in which the driver can improve the driving efficiency. In some embodiments, the logic further causes the computing device to provide instructions to the driver to improve the driving efficiency.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for driver coaching. Some embodiments may be configured for vehicles to share traffic information and fuel economy information for segments of a route over a network. These embodiments then compare a driver's performance along the route with the performance of other drivers to determine a score for that driver (such as a fuel economy score, a vehicle preservation score, a tire preservation score, a brake preservation score, a travel time score, and/or other score). Embodiments may also use the data from other vehicles to predict the conditions on a driver's route and determine when to suggest or activate certain controls.

Some embodiments may be configured to access information about a certain route segment saved on a remote computing device. These embodiments may collect a driver's performance data for a certain segment of the route and may compare the performance data to data from other drivers on the same segment, potentially during a similar day and/or time. The embodiments may then provide a score to the driver based on his or her vehicle's fuel economy, vehicle preservation, travel time, etc.

Some embodiments may provide tips and/or instructions to the driver to help him or her improve one or more of the determined scores related to driving efficiency. Some embodiments may be configured to rank the driver's score among the scores of other drivers on the same segment. Similarly, some embodiments may use the shared information about traffic along various route segments to determine when to suggest that the driver implement certain driving habits or behaviors. For example, embodiments may suggest when the driver should coast, and/or take other driving action during a given segment. Embodiments may also be configured to engage certain active controls on the vehicle during operation based on the characteristics of the route segment, such as active cruise control.

Figure 1:
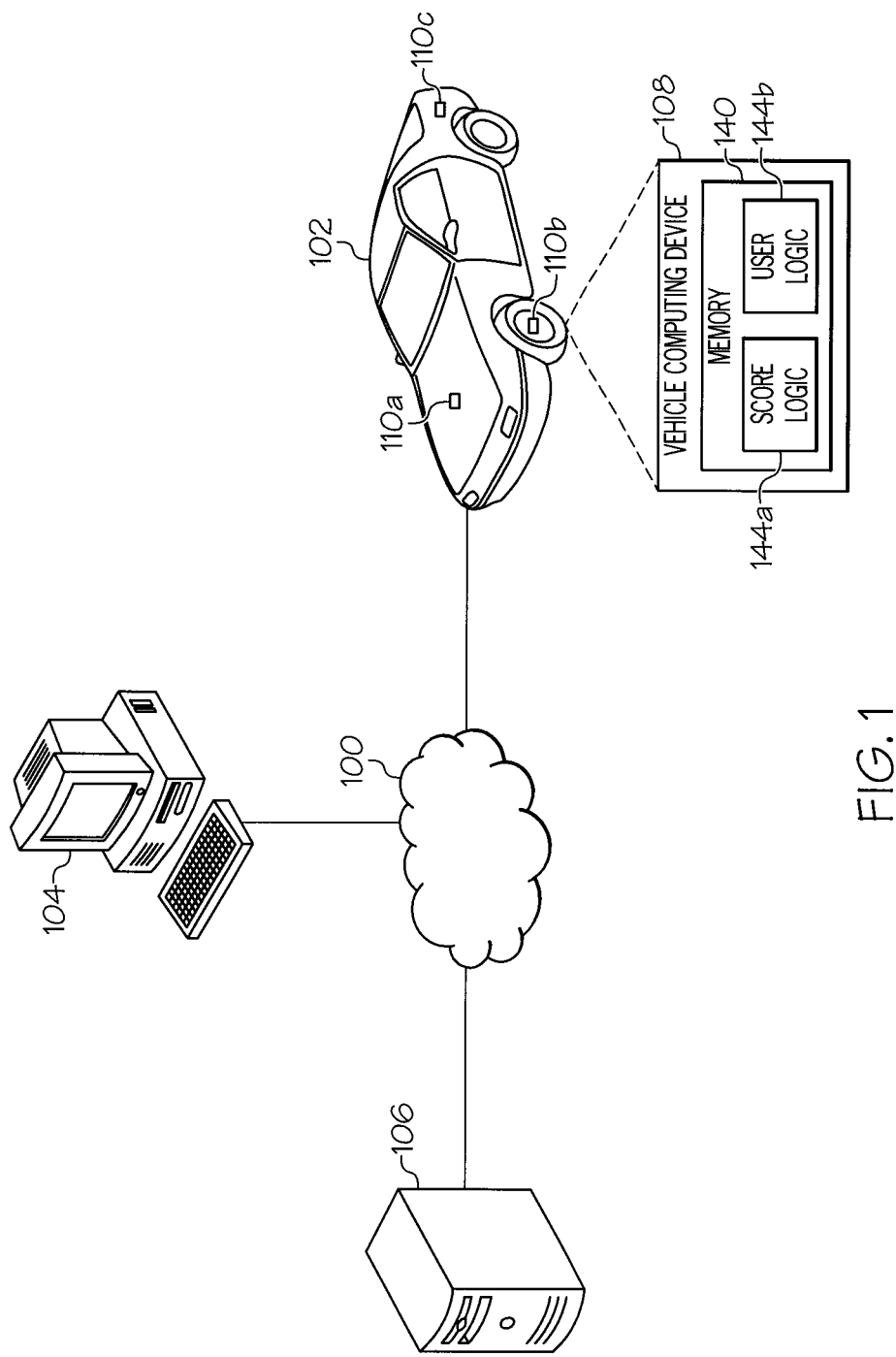
FIG. 1 depicts a computing environment for providing driver coaching, according to embodiments described herein.

Referring now to the drawings, FIG. 1 depicts a computing environment for providing driver coaching, according to embodiments described herein. As illustrated, the computing environment includes a network 100, a vehicle 102, a user computing device 104 and a remote computing device 106.

The network 100 may include a wide area network, such as the internet, a mobile device network (such as 3G, 4G, LTE), a public switched telephone network (PSTN), etc. Additionally, the network 100 may include a local area network, such as wireless fidelity (WiFi), Bluetooth™, near field communication (NFC), etc. Accordingly, the network 100 may facilitate communication between two or more devices via an intermediary device or without an intermediary device. As such, depictions of communications between two devices that utilize the network 100 may be direct device-to-device communications, depending on the embodiment.

The vehicle 102 may include a plurality of sensors 110 for determining vehicle efficiency data. As an example, the vehicle 102 may include a fuel consumption sensor 110*a*, a tire wear sensor 110*b*, a brake wear sensor 110*c*, a weight sensor, and/or other sensor for determining efficiency data associated with the vehicle 102. It should be understood that while the sensors 110 may include hardware sensors that directly detect the fuel consumption, brake wear, tire wear, etc., this is merely one embodiment. As an example, some embodiments may indirectly measure efficiency of the vehicle 102 via indirect sensors and/or software. In this example, the vehicle computing device 108 may determine a speed of the vehicle 102 a distance to stop, a force applied to the brakes, environmental conditions during the stop, expected longevity of the brakes and/or other data to estimate wear on the brakes. From this information, the vehicle computing device 108 may estimate braking efficiency of the driver over a predetermined segment of a route. Similarly, other efficiency metrics may be measured directly and/or calculated from indirect data.

Additionally, the vehicle 102 may include a vehicle computing device 108 that includes a memory component 140 that stores score logic 144*a*, user logic 144*b*, and/or other components. The vehicle computing device 108 may also include components such as a human-machine interface (HMI), which may be embodied as a vehicle display for providing one or more user interfaces, such as those depicted in FIGS. 3-7. As described in more detail below, the score logic 144*a* may include instructions for determining a driver score over a predetermine segment of a route. The score may be determined from data stored at the remote computing device 106, as the score may be relative to other drivers' performance. Similarly, the user logic 144*b* may include instructions for determining the efficiency of the driver's performance. Specifically, the user logic 144*b* may be configured to cause the vehicle computing device 108 to determine scores for the user's performance based on fuel efficiency, travel time, braking efficiency, tire efficiency, and/or other types of scores.

Additionally, the user computing device 104 may be configured for a user to view and/or edit data related to driving scores, and/or other information regarding his or her driving performance. The remote computing device 106 may receive information from the vehicle computing device 108 and/or other vehicle computing devices to compute the rankings and/or scores of various drivers across predetermined route segments. The remote computing device 106 may additionally consider time of day, traffic, vehicle performance, and/or other external data to further evaluate the drivers' performance. As an example, if a driver of the vehicle 102 traverses a route during rush hour, the vehicle efficiency may be worse than for a driver that traversed the route during a time of low traffic. Depending on the particular embodiment, these factors may be utilized to normalize the scores and provide a ranking for all (or at least a portion) of the drivers across the segment. In some embodiments, the remote computing device 106 may segregate driver performance based on one or more of these external factors.

Figure 2:
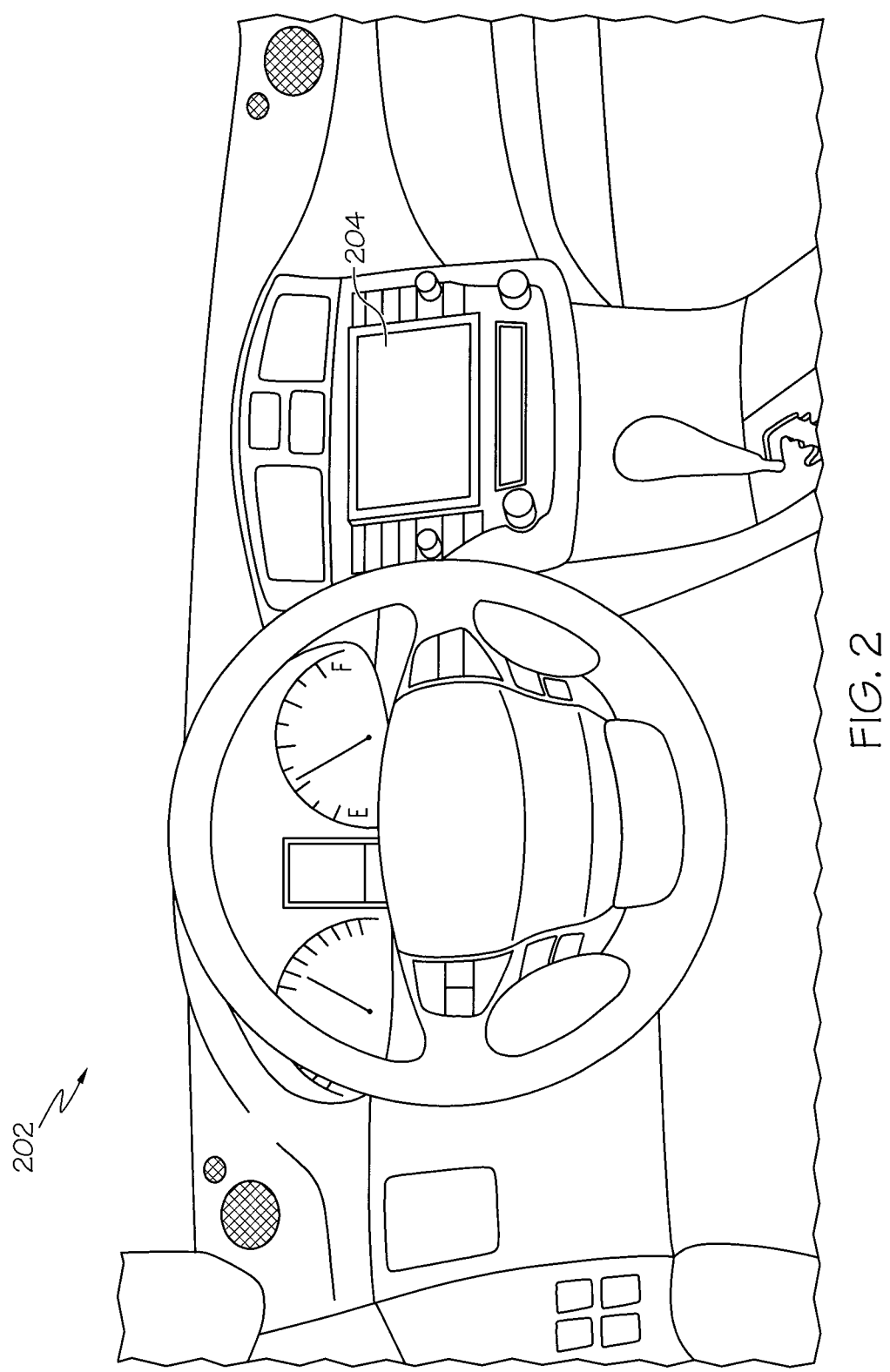
FIG. 2 depicts a vehicle interior for providing driver coaching, according to embodiments described herein.

FIG. 2 depicts a vehicle interior 202 for providing driver coaching, according to embodiments described herein. As illustrated, the vehicle interior 202 may include a vehicle display 204, which may include a touch screen, visual display, audio display, and/or other hardware components. As discussed above, the vehicle display 204 may be coupled to the vehicle computing device 108 (FIG. 1) and thus may provide one or more user interfaces for driver coaching.

Figure 3:
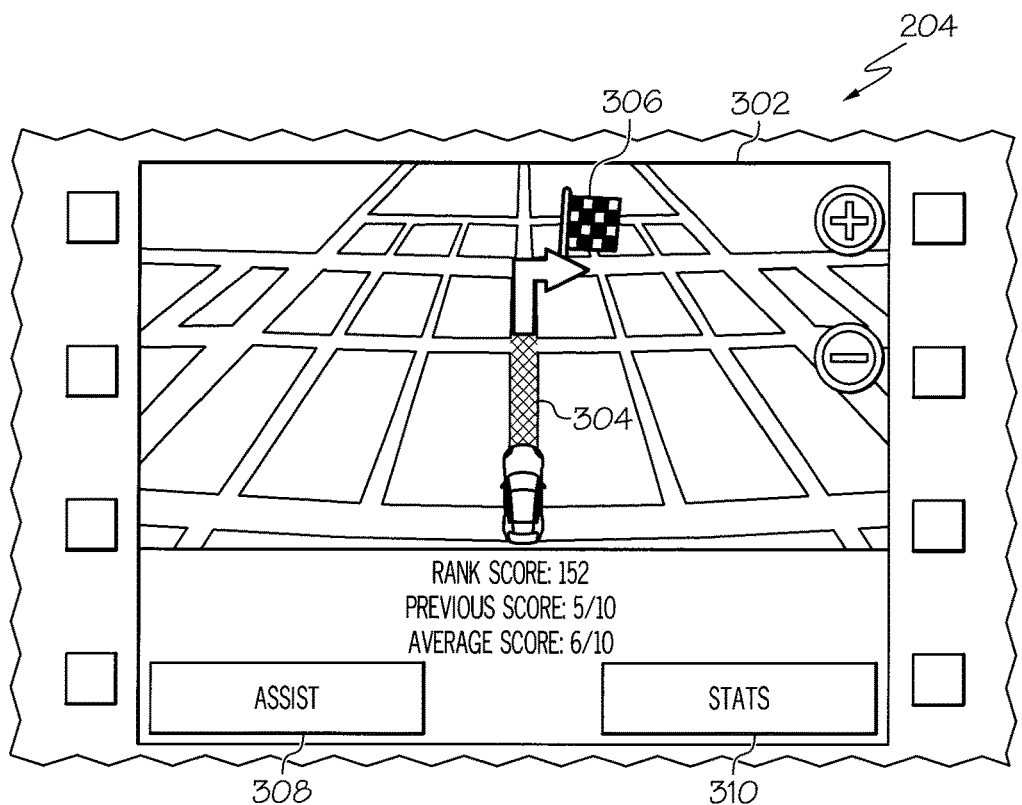
FIG. 3 depicts a user interface for providing a determined route and driver scoring data, according to embodiments described herein.

FIG. 3 depicts a user interface 302 for providing a determined route 304 and driver scoring data, according to embodiments described herein. As illustrated, the vehicle display 204 may provide the user interface 302, which may include a determined route 304 that the vehicle 102 will take to a destination 306. The determined route 304 may be determined based on a positioning system entry, predicted based on past user actions, and/or determined via other criteria. Regardless, the vehicle computing device 108 may additionally receive signals from the sensors 110 to determine how efficiently the driver is operating the vehicle 102 over at least a segment of the determined route 304. As an example, the fuel consumption sensor 110*a* may send a signal to the vehicle computing device 108 indicating the fuel consumption rate of the vehicle 102 over a predetermined segment of the route. The tire wear sensor 110*b* may monitor wear on one or more of the tires, which is sent to the vehicle computing device 108. The brake wear sensor 110*b* may similarly report brake wear to the vehicle computing device 108 over the segment of the route. Once the vehicle computing device 108 receives the sensor data, the vehicle computing device 108 may determine efficiency data for the driver over the segment. This efficiency data may then be utilized to provide a score for the user over the segment. The score and/or the efficiency data may be sent to the remote computing device 106, which may provide rankings of the driver when compared with other drivers over the segment and/or similar segments that other drivers have traversed. Accordingly, the user interface 302 may provide one or more driver statistics regarding the driver over the segment and/or over other segments. The statistics may include rankings comparing other drivers and/or gross rankings based on predetermined criteria.

As an example, a score may be determined based on a comparison of the driver's actions compared with a predetermined perfect driver over the segment. The predetermined perfect driver may be determined using an optimal acceleration rate, an optimal deceleration rate, an optimal turn speed, an optimal top speed, an optimal distance traveled, and/or other optimal data. This may be compared with the driver's performance on these categories to determine the driver's score. Additional factors may also be utilized to contribute to the score, such as payload weight of the vehicle 102 (e.g., if the vehicle is heavier than the optimal driver's vehicle), road conditions, environmental conditions, time of day, traffic, and/or other data that could affect vehicle efficiency. Based on these criteria, the driver may be compared to the optimal driver to determine a score for at least that segment of the route.

Also provided in the example of FIG. 3 are an assist option 308 and a statistics option 310. In response to selecting the assist option 308, the vehicle computing device 108 may activate an assist feature on the vehicle 102. The assist feature may be configured to further determine how the driver may improve. The improvement may take the form of increased vehicle efficiency, which may include increased engine efficiency, increased brake efficiency, increased tire efficiency, decreased travel time, improving distance traveled along the route, etc., as discussed in more detail below. Similarly, in response to selection of the statistics option 310, additional statistics regarding the driver's performance may be provided.

Figure 4:
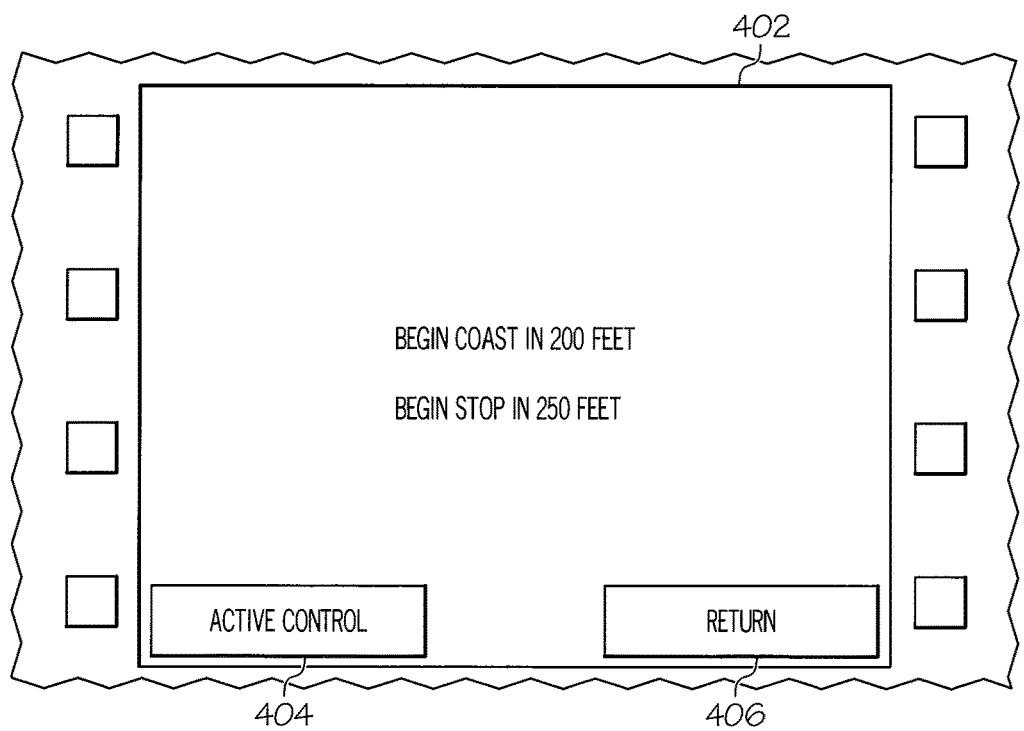
FIG. 4 depicts a user interface for providing driver coaching, according to embodiments described herein.

FIG. 4 depicts a user interface 402 for providing driver coaching, according to embodiments described herein. In response to selection of the assist option 308 from FIG. 3, the user interface 402 may be provided. As illustrated, the user interface 402 may provide instructions to the driver to improve driving and efficiency of the vehicle 102. As an example, the vehicle computing device 108 may determine a speed of the vehicle 102, a planned next stop (or other deceleration) and, based on the current route segment, may determine when the driver should release the accelerator of the vehicle 102 and begin coasting. The user interface 402 may then provide an instruction to begin coasting. Similarly, if the route segment includes an uphill portion, the vehicle computing device 108 may determine that the driver will need to accelerate to a predetermined speed to most efficiently traverse this segment of the route. Accordingly, the user interface 402 may provide the driver with instructions on when to accelerate and to what speed. Other instructions may also be provided, such as an indication of when to begin coasting, an indication of when to accelerate, an indication of a cruising speed, an indication related to operation mode, and an indication related to heating venting air conditioning (HVAC) settings.

It should be understood that while the instructions described with reference to FIG. 4 may include instructions for efficient driving, other objectives may also be used. Specifically, some embodiments the objective may be to reduce travel time, reduce travel distance; increase brake lifespan; increase tire lifespan; etc. Accordingly, some embodiments may provide at least one user option for a user to select the purpose of the instructions provided in the user interface 402.

Also provided in the user interface 402 are an active control option 404 and a return option 406. In response to selection of the active control option 404, the vehicle computing device 108 may instruct the vehicle 102 to implement one or more active controls to the vehicle 102. As an example, the vehicle 102 may be configured with an active cruise control module that automatically adjusts the cruise control speed to substantially match the speed of surrounding vehicles. Thus, if the speed of a surrounding vehicle in front of the vehicle 102 changes, the active cruise control will respond accordingly. Similarly, the vehicle 102 may be configured with an active coast function or other active control that may assist the driver in operating the vehicle 102 in a more efficient or otherwise desirable manner. In response to selection of the return option 406, a previous user interface may be provided. In some embodiments, the active control may be engaged in response to a driver selection and/or a driver score.

Figure 5:
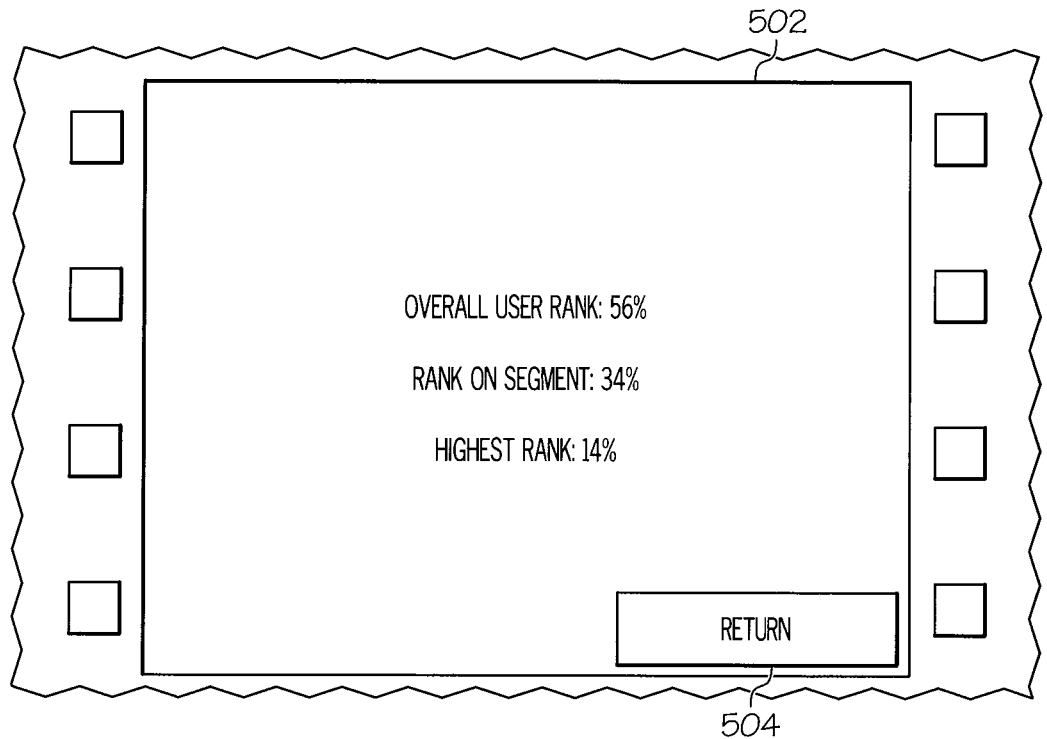
FIG. 5 depicts a user interface for providing driver rankings, according to embodiments described herein.

FIG. 5 depicts a user interface 502 for providing driver rankings, according to embodiments described herein. In response to selection of the statistics option 310 from FIG. 3, the user interface 502 may be provided. As illustrated, the user interface 502 may include statistics regarding the driver's overall rank, rank on a current segment of a route, and/or the highest rank the driver has obtained. Other statistics may also be provided, such as the number of times during a segment that the driver braked correctly, coasted correctly, accelerated correctly, turned correctly, as well as the number of times the driver performed these tasks incorrectly. Other data may also be provided.

Figure 6:
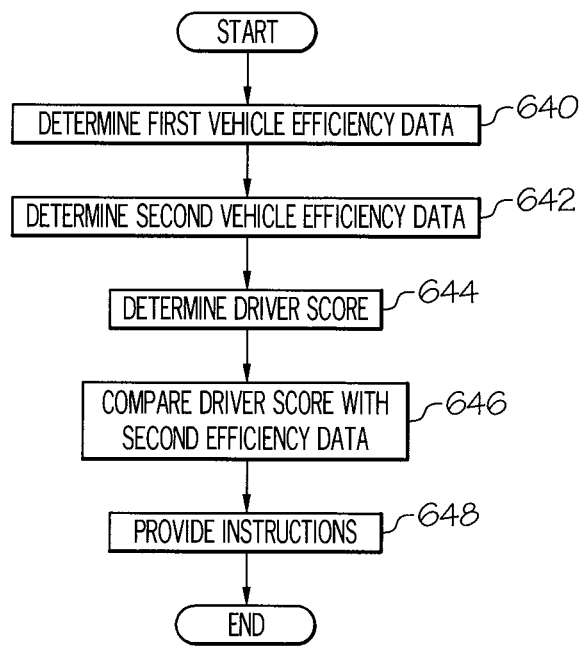
FIG. 6 depicts a flowchart for providing driver coaching, according to embodiments described herein.

FIG. 6 depicts a flowchart for providing driver coaching, according to embodiments described herein. As illustrated in block 640, a determination may be made regarding the first vehicle efficiency data related to a first vehicle 102. As discussed above, the first vehicle 102 may include the vehicle computing device 108 that determines first driving data for the driver's operation of the vehicle 102. The first driving data may include data related to whether the vehicle 102 is being operated according to a predetermined objective (such as whether the driver braked properly, coasted properly, accelerated properly, etc.). As discussed above, the objective may include vehicle efficiency and/or other objectives. In block 642, a determination of second driving data may be made. The second driving data may be similar to the first driving data and thus may include second vehicle efficiency data. This may or may not include data over a common segment of a route. In block 644, a driver score may be determined, based on the efficiency data from the first vehicle 102. As discussed above, the driver score may include an objective driver score that is based on predetermined criteria and/or might include a comparison of the driver of the first vehicle and a driver of a second vehicle. Accordingly, in block 646 the driver score may be compared with the second efficiency data to determine how the driver of the first vehicle compares. In block 648, instructions may be provided to the driver of the first vehicle, based on the driver score and/or the comparison of the driver score with the second efficiency data to improve the driver's performance in traversing the remaining portion of the route and/or otherwise.

It should be understood that while some embodiments may be configured such that the vehicle computing device 108 performs the actions described with reference to FIG. 6, this is one embodiment. In some embodiments, the vehicle computing device 108 may request data from the remote computing device 106, which process the data and provides the scores, comparison, and/or instructions.

Figure 7:
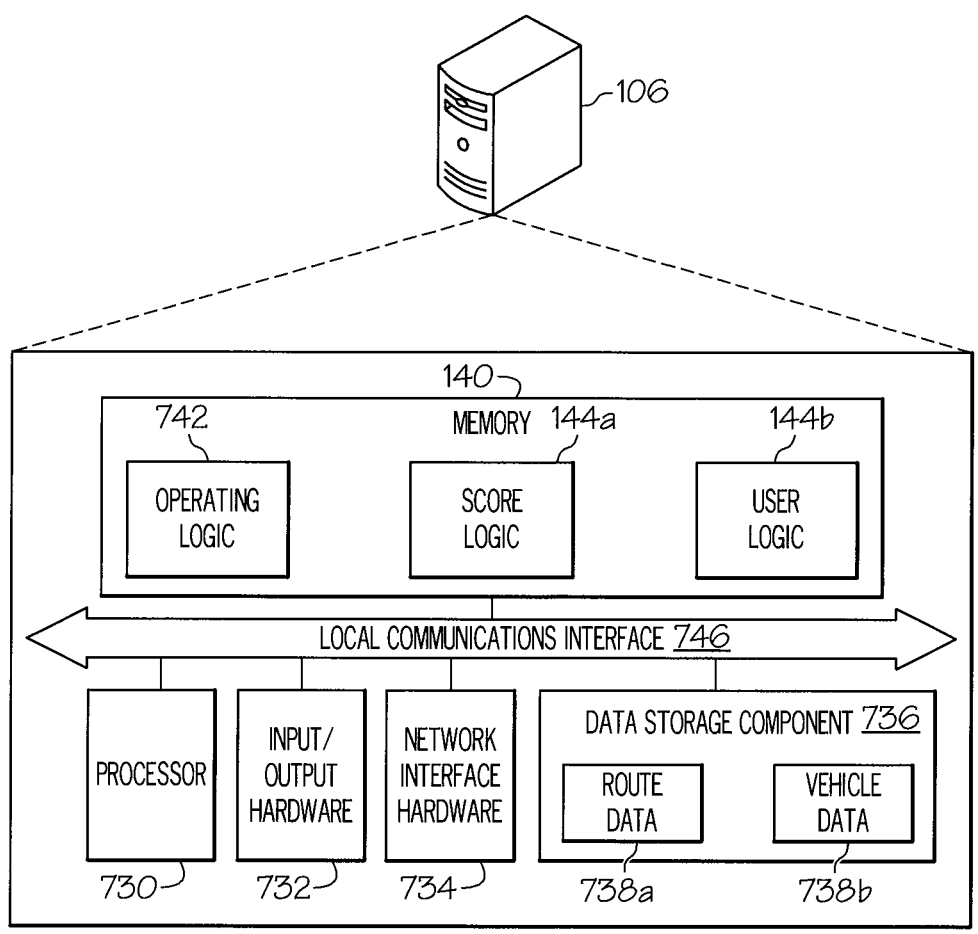
FIG. 7 depicts details of a vehicle computing device that may be utilized for providing driver coaching.

FIG. 7 depicts details of a vehicle computing device 108 that may be utilized for providing driver coaching. The vehicle computing device 108 includes a processor 730, input/output hardware 732, network interface hardware 734, a data storage component 736 (which stores route data 738a, vehicle data 738b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 108 and/or external to the vehicle computing device 108.

The memory component 140 may store operating system logic 742, the score logic 144a and the user logic 144b. The score logic 144a and the user logic 144b may each include a plurality of different pieces of logic, each of which may be embodied as a computer program, firmware, and/or hardware, as an example. A local interface 746 is also included in FIG. 7 and may be implemented as a bus or other communication interface to facilitate communication among the components of the vehicle computing device 108.

The processor 730 may include any processing component operable to receive and execute instructions (such as from a data storage component 736 and/or the memory component 140). As described above, the input/output hardware 732 may include and/or be configured to interface with the components of FIG. 7.

The network interface hardware 734 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the vehicle computing device 108 and other computing devices, such as those depicted in FIG. 1.

The operating system logic 742 may include an operating system and/or other software for managing components of the vehicle computing device 108. As discussed above, the score logic 144a may reside in the memory component 140 and may be configured to cause the processor 730 to communicate with the remote computing device 106 to evaluate a driver's performance over a predetermined segment of a route. Similarly, the user logic 144b may be utilized to determine the manner in which the driver is operating the vehicle 102.

It should be understood that while the components in FIG. 7 are illustrated as residing within the vehicle computing device 108, this is merely an example. In some embodiments, one or more of the components may reside external to the vehicle computing device 108. It should also be understood that, while the vehicle computing device 108 is illustrated as a single integrated device, this is also merely an example. In some embodiments, the score logic 144a and the user logic 144b may reside on different computing devices and/or the vehicle computing device 108 may be implemented as a mobile device. As an example, one or more of the functionalities and/or components described herein may be provided by the user computing device 104, the remote computing device 106 and/or other computing devices, which may be coupled to the vehicle computing device 108 via the network 100. These computing devices may also include hardware and/or software for performing the functionality described herein.

Additionally, while the vehicle computing device 108 is illustrated with the score logic 144a and the user logic 144b as separate logical components, this is also an example. In some embodiments, a single piece of logic may cause the vehicle computing device 108 to provide the described functionality.

As illustrated above, various embodiments for driver coaching are disclosed. These embodiments may provide a driver with instructions and/or active controls to more efficiently operate the vehicle 102. This functionality may allow for longer lasting vehicles, less fuel use, etc.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for providing driver coaching. It should also be understood that these embodiments are merely exemplary and are not intended to limit the scope of this disclosure.

What is claimed is:

1. A method for driver coaching comprising:
receiving, from a vehicle sensor by a vehicle computing device, vehicle data, wherein the vehicle sensor includes at least one of the following: a fuel consumption sensor, a tire wear sensor, a brake wear sensor, or a weight sensor;
determining, by the vehicle computing device, first vehicle efficiency data of a first vehicle, wherein the first vehicle efficiency data is determined from sensor data received from the vehicle sensor, wherein the vehicle efficiency data is determined as the first vehicle is traversing a route, and wherein the first vehicle efficiency data relates to a driving efficiency of a driver of the first vehicle;
receiving from a second by the vehicle computing device; second vehicle efficiency data associated with a third party in the second vehicle that previously traversed the route;
determining, by the vehicle computing device, a driver score from the first vehicle efficiency data;
comparing, by the vehicle computing device, the driver score with the second vehicle efficiency data to determine whether the driver can improve the driving efficiency;
in response to determining that the driver can improve, providing, by the vehicle computing device, driving instructions that include at least one driving command for traversing a remaining portion of the route, based on actions taken by the third party in traversing that portion of the route; and
ranking the driver against the third party who drives the second vehicle.

2. The method of claim 1, further comprising providing an active control for the first vehicle, based on at least one of the following: a driver selection and the driver score.

3. The method of claim 1 comprising providing a user option to determine an objective for determining the vehicle efficiency data.

4. The method of claim 3, wherein the objective includes at least one of the following: improving fuel efficiency, improving braking efficiency, improving tire efficiency, improving travel time, and improving distance traveled.

5. The method of claim 1, further comprising providing driver statistics regarding the vehicle efficiency data.

6. The method of claim 1, wherein the instructions include at least one of the following: an indication of when to begin coasting, an indication of when to accelerate, an indication of a cruising speed, an indication related to operation mode, and an indication related to heating venting air conditioning (HVAC) settings.

7. The method of claim 1, further comprising determining the route, wherein determining the route comprises at least one of the following: receiving user input regarding a destination and past driving actions.

8. A system for driver coaching, comprising:
a vehicle sensor for detecting first driving data for a first vehicle, wherein the vehicle sensor includes at least one of the following: a fuel consumption sensor, a tire wear sensor, a brake wear sensor, or a weight sensor;
a vehicle computing device that comprises a memory component and a processor, wherein the memory component stores logic that, when executed by the processor causes the system to perform at least the following:
determine the first driving data from the vehicle sensor for the first vehicle that traversed a route, wherein the first driving data relates to a driving efficiency of a driver;

determine a driver score for the driver based on the first driving data;

receive from a second vehicle, second driving data associated with a third party in the second vehicle that traversed the route;

determine a driving efficiency of the third party;

compare the driver score with the second vehicle efficiency data to determine a manner in which the driver can improve the driving efficiency;

provide to the driver, instructions for traversing a remaining portion of the route, wherein the instructions include at least one driving command to improve the driving efficiency over the remaining portion of the route; and rank the driving efficiency of the driver against the driving efficiency of the third party in the second vehicle.

9. The system of claim 8, wherein the logic further causes the system to provide an active control for the first vehicle, based on at least one of the following: a driver selection and the driver score.

10. The system of claim 8, wherein the logic further causes the system to provide a user option to determine an objective for determining the vehicle efficiency data.

11. The system of claim 10, wherein the objective includes at least one of the following: improving fuel efficiency, improving braking efficiency, improving tire efficiency, improving travel time, and improving distance traveled.

12. The system of claim 8, further comprising a remote computing device for communicating the second driving data to the vehicle computing device.

13. The system of claim 8, wherein the logic further causes the system to provide driver statistics regarding the vehicle efficiency data.

14. The system of claim 8, wherein the instructions include at least one of the following: an indication of when to begin coasting and an indication of when to accelerate.

15. A vehicle computing device for driver coaching comprising:

a processor; and a memory component that stores logic that, when executed by the processor, causes the vehicle computing device to perform at least the following:

determine first driving data from a vehicle sensor of a first vehicle that traversed route, wherein the vehicle sensor includes at least one of the following: a fuel consumption sensor, a tire wear sensor, a brake wear sensor, or a weight sensor and wherein the first driving data relates to a driving efficiency of the driver;

receive from a second vehicle; second driving data associated with a third party in the second vehicle that traversed the route;

compare the first driving data with the second driving data to determine a manner in which the driver can improve the driving efficiency;

provide the to the driver instructions for traversing a remaining portion of the route; where the instructions include at least one driving command to improve the driving efficiency over the remaining portion of the route; and rank the driving efficiency of the driver against a driving efficiency of the third party in the second vehicle.

16. The vehicle computing device of claim 15, wherein the vehicle computing device receives the second driving data from a remote computing device.

17. The vehicle computing device of claim 16, wherein the logic further causes the vehicle computing device to provide an active control for the first vehicle, based on a driver selection.

18. The vehicle computing device of claim 15, wherein the logic further causes the vehicle computing device to provide a user option to determine an objective for determining the vehicle efficiency data.

19. The vehicle computing device of claim 15, wherein the logic further causes the vehicle computing device to provide driver statistics regarding the vehicle efficiency data.

20. The vehicle computing device of claim 15, wherein the instructions include at least one of the following: an indication of when to begin coasting and an indication of when to accelerate.

* * * * *

UNITED STATES PATENT AND TRADEMARK OFFICE
CERTIFICATE OF CORRECTION

PATENT NO. : 10,109,218 B2
APPLICATION NO. : 14/835324
DATED : October 23, 2018
INVENTOR(S) : Joshua D. Payne and Craig Cauthen Page 1 of 1

It is certified that error appears in the above-identified patent and that said Letters Patent is hereby corrected as shown below:

In the Claims

In Column 8, Claim 1, Line 16, after "second", insert --vehicle,--.

In Column 8, Claim 1, Line 16, delete "device;" and insert --device,--.

In Column 10, Claim 15, Line 11, delete "vehicle;" and insert --vehicle,--.

In Column 10, Claim 15, Line 17, delete "route;" and insert --route,--.

Signed and Sealed this
Twenty-fifth Day of December, 2018

Andrei Iancu
*Director of the United States Patent and Trademark Office*